US012573111B2

(12) United States Patent
Katsube

(10) Patent No.: US 12,573,111 B2
(45) Date of Patent: Mar. 10, 2026

(54) INFORMATION PROCESSING DEVICE, INFORMATION PROCESSING SYSTEM, AND INFORMATION PROCESSING METHOD FOR APPROPRIATE DISPLAY OF PRESENTER AND PRESENTATION ITEM

(71) Applicant: Sony Group Corporation, Tokyo (JP)

(72) Inventor: Tomohiro Katsube, Saitama (JP)

(73) Assignee: Sony Group Corporation, Tokyo (JP)

( * ) Notice: Subject to any disclaimer, the term of this patent is extended or adjusted under 35 U.S.C. 154(b) by 119 days.

(21) Appl. No.: 18/691,461

(22) PCT Filed: Sep. 9, 2022

(86) PCT No.: PCT/JP2022/033842
§ 371 (c)(1),
(2) Date: Mar. 13, 2024

(87) PCT Pub. No.: WO2023/067940
PCT Pub. Date: Apr. 27, 2023

(65) Prior Publication Data
US 2024/0386638 A1     Nov. 21, 2024

(30) Foreign Application Priority Data

Oct. 21, 2021     (JP) ................................. 2021-172681

(51) Int. Cl.
*G06T 11/60*          (2006.01)
*G06T 3/40*          (2006.01)
(Continued)

(52) U.S. Cl.
CPC ................ *G06T 11/60* (2013.01); *G06T 3/40*
(2013.01); *G06T 5/50* (2013.01); *G06T 7/20*
(2013.01); *G06T 2207/20224* (2013.01)

(58) Field of Classification Search
CPC ... G06T 11/60; G06T 3/40; G06T 5/50; G06T
7/20; G06T 2207/20224
See application file for complete search history.

(56) References Cited

U.S. PATENT DOCUMENTS

2007/0040898 A1     2/2007  Lee
2012/0075407 A1*    3/2012  Wessling  ............... H04N 7/142
                                                  348/E7.083

(Continued)

FOREIGN PATENT DOCUMENTS

JP          2008258779 A  * 10/2008
JP          2015192247 A     11/2015

OTHER PUBLICATIONS

International Search Report and Written Opinion mailed on Nov. 22, 2022, received for PCT Application PCT/JP2022/033842, filed on Sep. 9, 2022, 08 pages including English Translation.

*Primary Examiner* — Terrell M Robinson
(74) *Attorney, Agent, or Firm* — XSENSUS LLP

(57)          ABSTRACT

A presenter terminal device that is one example of an information processing device according to one aspect of the present disclosure includes: an identification unit that identifies an area to be synthesized having a size of a face image including a face in a second image (for example, current image) while avoiding a change area where an information amount in a first image (for example, previous image) and the second image changes; and a synthesis unit that synthesizes the face image in the area to be synthesized in the second image and generates a synthesized image including the second image and the face image.

19 Claims, 9 Drawing Sheets

(51) Int. Cl.
    *G06T 5/50*         (2006.01)
    *G06T 7/20*         (2017.01)

(56)            References Cited

U.S. PATENT DOCUMENTS

| | | | | |
|---|---|---|---|---|
| 2013/0188007 | A1* | 7/2013 | Duong ..................... | H04N 7/15 |
| | | | | 348/E7.083 |
| 2014/0026270 | P1* | 1/2014 | Suphachadiwong .... | A01H 5/02 |
| | | | | Plt./311 |
| 2015/0287162 | A1* | 10/2015 | Canan ..................... | G06F 16/51 |
| | | | | 345/522 |
| 2016/0173821 | A1* | 6/2016 | De Magalhaes ....... | H04N 23/61 |
| | | | | 348/14.08 |
| 2016/0359941 | A1* | 12/2016 | Kvaal ................... | H04L 65/403 |
| 2020/0388060 | A1 | 12/2020 | Rimon | |
| 2022/0140862 | A1* | 5/2022 | Ansley .................... | H04B 3/02 |
| | | | | 375/257 |

\* cited by examiner

20

TERMINAL DEVICE

21

COMMUNICATION UNIT

22

STORAGE UNIT

23

INPUT UNIT

24

OUTPUT UNIT

25

CONTROL UNIT

30

TERMINAL DEVICE

31

COMMUNICATION UNIT

32

STORAGE UNIT

33

INPUT UNIT

34

OUTPUT UNIT

35

CONTROL UNIT

35a

CREATION UNIT

35b

IDENTIFICATION UNIT

35c

SYNTHESIS UNIT

FIG.5

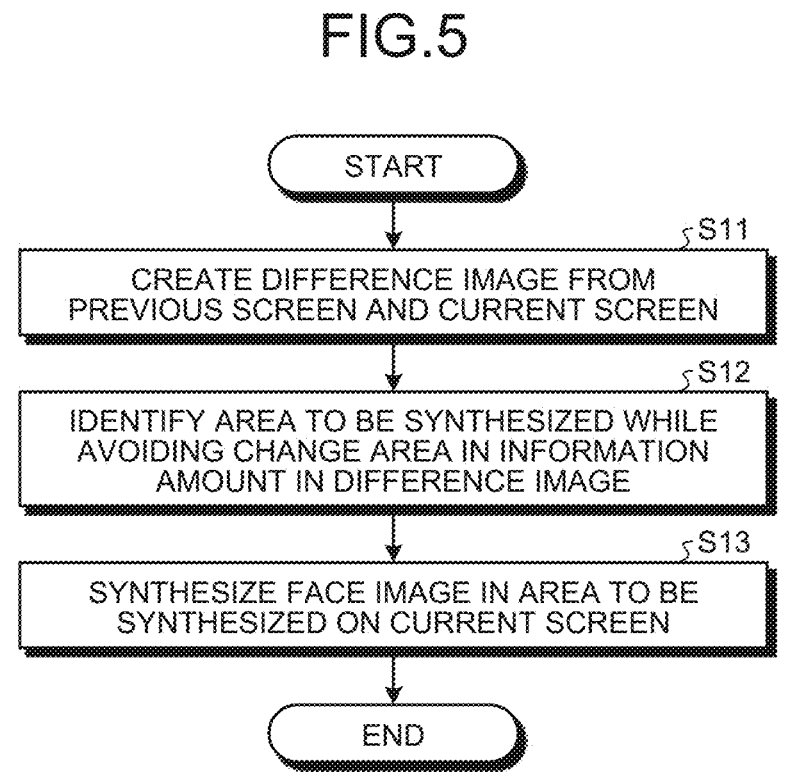

```
        ┌─────────────┐
        │    START    │
        └─────────────┘
               │
               ▼                            ⌐S11
┌──────────────────────────────────────────┐
│      CREATE DIFFERENCE IMAGE FROM         │
│   PREVIOUS SCREEN AND CURRENT SCREEN      │
└──────────────────────────────────────────┘
               │
               ▼                            ⌐S12
┌──────────────────────────────────────────┐
│  IDENTIFY AREA TO BE SYNTHESIZED WHILE    │
│   AVOIDING CHANGE AREA IN INFORMATION     │
│       AMOUNT IN DIFFERENCE IMAGE          │
└──────────────────────────────────────────┘
               │
               ▼                            ⌐S13
┌──────────────────────────────────────────┐
│   SYNTHESIZE FACE IMAGE IN AREA TO BE     │
│     SYNTHESIZED ON CURRENT SCREEN         │
└──────────────────────────────────────────┘
               │
               ▼
        ┌─────────────┐
        │     END     │
        └─────────────┘
```

INFORMATION PROCESSING DEVICE, INFORMATION PROCESSING SYSTEM, AND INFORMATION PROCESSING METHOD FOR APPROPRIATE DISPLAY OF PRESENTER AND PRESENTATION ITEM

CROSS-REFERENCE TO RELATED APPLICATIONS

The present application is based on PCT filing PCT/JP2022/033842, filed Sep. 9, 2022, which claims priority to Japanese Patent Application No. 2021-172681, filed Oct. 21, 2021, the entire contents of each are incorporated herein by reference.

FIELD

The present disclosure relates to an information processing device, an information processing system, and an information processing method.

BACKGROUND

For example, in online meetings, online seminars, online classes, and the like, presentation materials and the presenter's face are simultaneously displayed in some cases. Meanwhile, in online live commentary for games, sports, and the like, the video of the subject being commented and the face of the live commentator are simultaneously displayed in some cases. For example, as a technique related to online meetings, a technique has been developed that allows two or more terminals to send and receive information about the situation in each other's meeting rooms and the like in online meetings (for example, see Patent Literature 1).

CITATION LIST

Patent Literature

Patent Literature 1: JP 2008-258779 A

SUMMARY

Technical Problem

However, usually in online meetings, online seminars, online classes, and the like, the positions of the materials (presentation item) and the face (presenter) within the screen are determined in advance, or the position of one of the two within the screen is determined and the position of the other within the screen is arbitrarily changed by a user via a user interface. Furthermore, in online live commentary and the like, the positions of the video of the subject being commented (presentation item) and the face of the live commentator (presenter) within the screen are usually determined in advance, and the positions are fixed.

When the materials and the face are fixed within the screen in this way, since the face is displayed next to the materials to prevent the face from overlapping with the materials, the screen area cannot be used effectively. Meanwhile, in a case where either the materials or the face is changed arbitrarily, if the position of the face within the screen remains unchanged, depending on the page of the materials, important parts may be hidden by the face. To avoid this situation, if the presenter tries to move the position of the face within the screen depending on the page, the face has to be moved manually, which is cumbersome. Such a situation also occurs in online live commentary.

Therefore, the present disclosure proposes an information processing device, an information processing system, and an information processing method capable of appropriately displaying the presentation item and the presenter while making effective use of the screen area.

Solution to Problem

An information processing device according to the embodiment of the present disclosure includes: an identification unit that identifies an area to be synthesized in a second image while avoiding a change area where an information amount in a first image and the second image changes, the area to be synthesized having a size of a face image including a face; and a synthesis unit that synthesizes the face image in the area to be synthesized in the second image and generates a synthesized image including the second image and the face image.

An information processing system according to the embodiment of the present disclosure includes: a plurality of information processing devices, any one of the plurality of information processing devices including: an identification unit that identifies an area to be synthesized in a second image while avoiding a change area where an information amount in a first image and the second image changes, the area to be synthesized having a size of a face image including a face; and a synthesis unit that synthesizes the face image in the area to be synthesized in the second image and generates a synthesized image including the second image and the face image.

An information processing method according to the embodiment of the present disclosure includes: identifying an area to be synthesized in a second image while avoiding a change area where an information amount in a first image and the second image changes, the area to be synthesized having a size of a face image including a face; and synthesizing the face image in the area to be synthesized in the second image and generating a synthesized image including the second image and the face image.

BRIEF DESCRIPTION OF DRAWINGS

FIG. 5 is a flowchart illustrating a flow of a first processing example of the presenter terminal device according to the embodiment of the present disclosure.

DESCRIPTION OF EMBODIMENTS

Embodiments of the present disclosure will be described in detail below with reference to the drawings. Note that these embodiments do not limit devices, systems, methods, and the like according to the present disclosure. In each of the following embodiments, identical elements are basically denoted with identical reference signs to omit redundant descriptions.

One or more embodiments described below (including examples and modifications) can each be implemented independently. Meanwhile, at least part of the plurality of embodiments described below may be implemented in combination with at least part of other embodiments as appropriate. The plurality of embodiments can include novel features different from each other. Therefore, the plurality of embodiments can contribute to solving objectives or problems different from each other, and can produce effects different from each other.

The present disclosure will be described according to the order of items shown below.

1. Embodiment
1-1. Configuration example of information processing system
1-2. Configuration example of server device
1-3. Configuration example of viewer terminal device
1-4. Configuration example of presenter terminal device
1-5. First processing example of presenter terminal device
1-6. Modification of information processing system
1-7. Second processing example of presenter terminal device
1-8. Third processing example of presenter terminal device
1-9. Actions and advantageous effects
2. Other embodiments
3. Configuration example of hardware
4. Additional notes

1. Embodiment

1-1. Configuration Example of Information Processing System

Figure 1:
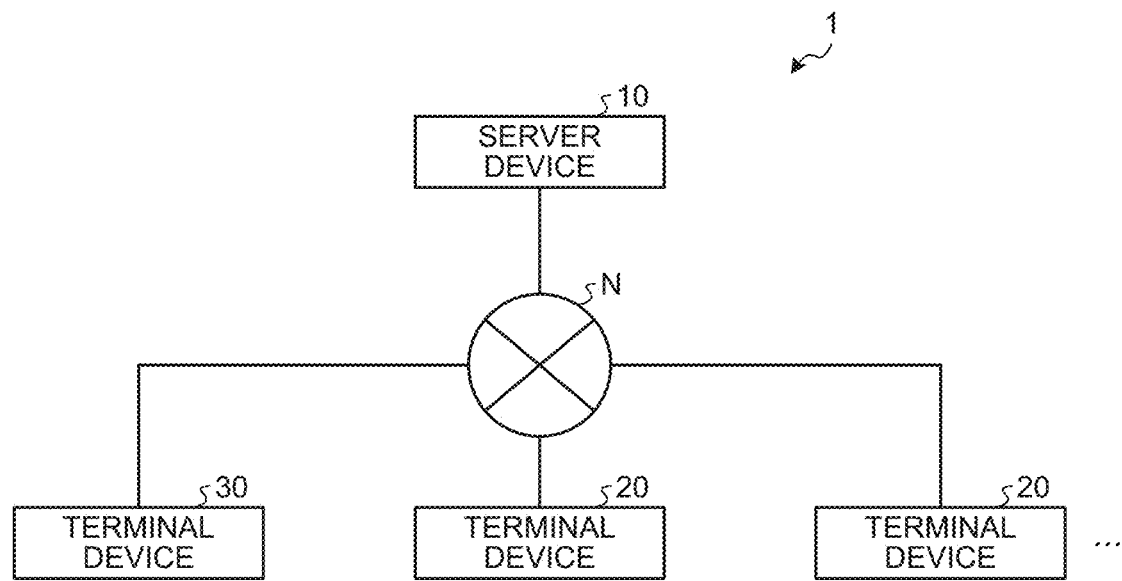
FIG. 1 is a diagram illustrating one example of a schematic configuration of an information processing system according to an embodiment of the present disclosure.

A configuration example of an information processing system 1 according to the present embodiment will be described with reference to FIG. 1. FIG. 1 is a diagram illustrating one example of the schematic configuration of the information processing system 1 according to the present embodiment.

As illustrated in FIG. 1, the information processing system 1 includes a server device 10 and a plurality of terminal devices 20 and 30. The server device 10 and each of the terminal devices 20 and 30 are configured to transmit and receive (communicate) various pieces of information via a wireless and/or wired network N. The server device 10 and each of the terminal devices 20 and 30 each function as an information processing device. Note that FIG. 1 is an illustration, and the number of server devices 10, terminal devices 20 and 30, network N, and the like is not limited.

The network N is a communication network (communication network) such as a local area network (LAN), wide area network (WAN), cellular network, fixed telephone network, regional Internet protocol (IP) network, and the Internet. The network N may include a wired network or a wireless network. The network N may include a core network. The core network is, for example, an evolved packet core (EPC) or 5G core network (5GC). The network N may include a data network other than the core network. For example, the data network may be a carrier's service network, such as an IP multimedia subsystem (IMS) network, for example. The data network may be a private network, such as an intranet.

For example, the communication device such as the terminal device 20 may be configured to connect to the network N by using radio access technology (PAT), such as long term evolution (LTE), new radio (NR), Wi-Fi (registered trademark), and Bluetooth (registered trademark). At this time, the communication device may be configured to be able to use different radio access technologies. For example, the communication device may be configured to be able to use NR and Wi-Fi. The communication device may be configured to be able to use different cellular communication technologies (for example, LTE and NR). LTE and NR are one type of cellular communication technology, and enable mobile communication for communication devices such as the terminal device 20 by arranging a plurality of areas covered by base stations in a form of cells.

The server device 10 is a server that manages and relays various pieces of information. For example, the server device 10 manages various pieces of information such as identification information regarding each of the terminal devices 20 and 30, and relays various pieces of information including image information such as an image of a presentation item and a face image of a presenter (for example, image information such as presentation materials and the presenter's face). For example, the server device 10 may be a cloud server, a PC server, a midrange server, or a mainframe server.

The terminal device 20 is a terminal owned by a viewer who is a user. For example, the terminal device 20 exchanges various pieces of information including image information such as an image of a presentation item and a face image of a presenter with the server device 10. For example, the terminal device 20 is a personal computer (for example, notebook computer or desktop computer), smart device (for example, smartphone or tablet), personal digital assistant (PDA), mobile phone, and the like. The terminal device 20 may be an xR device, such as an augmented reality (AR) device, a virtual reality (VR) device, or a mixed reality (MR) device. Here, the xR device may be a glasses-type device (for example, AR/MR/VR glasses), and may be a head-mounted or goggle-type device (for example, AR/MR/VR headset, AR/MR/VR goggle). These xR devices may display images for only one eye, or may display images for both eyes.

The terminal device 30 is a terminal owned by a presenter who is a user. For example, the terminal device 30 exchanges various pieces of information including image information such as an image of a presentation item and a face image of a presenter with the server device 10. For example, the terminal device 30 is a personal computer (for example, notebook computer or desktop computer), smart device (for example, smartphone or tablet), personal digital assistant (PDA), and the like.

1-2. Configuration Example of Server Device

Figure 2:
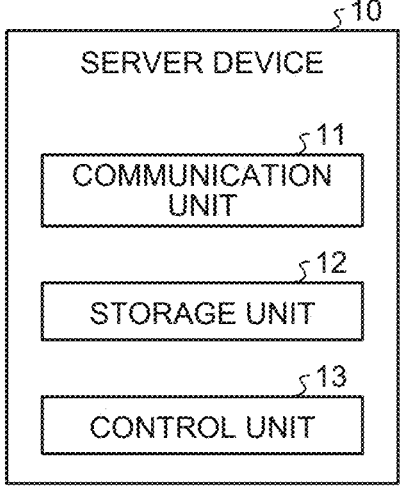
FIG. 2 is a diagram illustrating one example of a schematic configuration of a server device according to the embodiment of the present disclosure.

A configuration example of the server device 10 according to the present embodiment will be described with reference to FIG. 2. FIG. 2 is a diagram illustrating one example of the schematic configuration of the server device 10 according to the present embodiment.

As illustrated in FIG. 2, the server device 10 includes a communication unit 11, a storage unit 12, and a control unit 13. Note that the configuration illustrated in FIG. 2 is a functional configuration, and the hardware configuration may be different from this configuration. The functions of the server device 10 may be distributed and implemented in a plurality of physically separated configurations. For example, the server device 10 may include a plurality of server devices.

The communication unit 11 is a communication interface for communicating with other devices. For example, the communication unit 11 is a local area network (LAN) interface such as a network interface card (NIC). The communication unit 11 may be a wired interface or a wireless interface. The communication unit 11 communicates with each of the terminal devices 20 and 30 or the like under the control of the control unit 13.

The storage unit 12 is a storage device that can read and write data, such as a dynamic random access memory (DRAM), static random access memory (SRAM), flash memory, and hard disk. The storage unit 12 stores various pieces of necessary information as appropriate under the control of the control unit 13. For example, the storage unit 12 stores identification information regarding each of the terminal devices 20 and 30, or various pieces of information including image information such as an image of a presentation item and a face image of a presenter.

The control unit 13 is a controller that controls each unit of the server device 10. The control unit 13 is implemented, for example, by a processor such as a central processing unit (CPU) or a micro processing unit (MPU). For example, the control unit 13 is implemented by the processor executing various programs stored in a storage device within the server device 10 by using a random access memory (RAM) and the like as a work area. Note that the control unit 13 may be implemented by an integrated circuit such as an application specific integrated circuit (ASIC) and field programmable gate array (FPGA). The CPU, MPU, ASIC, and FPGA can all be regarded as controllers. Note that the control unit 13 may be implemented by a graphics processing unit (GPU) in addition to or instead of the CPU.

1-3. Configuration Example of Viewer Terminal Device

Figure 3:
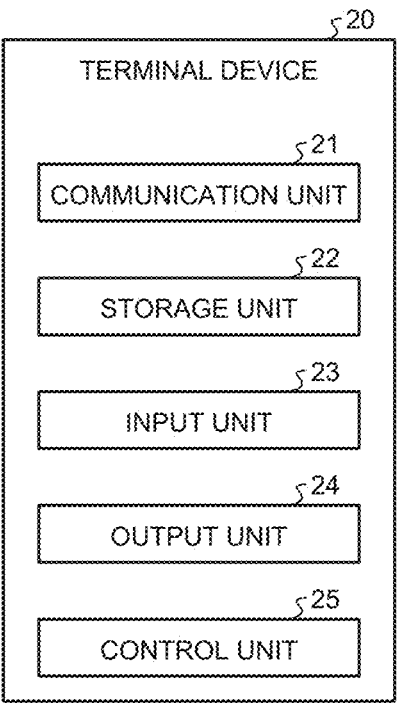
FIG. 3 is a diagram illustrating one example of a schematic configuration of a viewer terminal device according to the embodiment of the present disclosure.

A configuration example of the viewer terminal device 20 according to the present embodiment will be described with reference to FIG. 3. FIG. 3 is a diagram illustrating one example of the schematic configuration of the viewer terminal device 20 according to the present embodiment.

As illustrated in FIG. 3, the terminal device 20 includes a communication unit 21, a storage unit 22, an input unit 23, an output unit 24, and a control unit 25. Note that the configuration illustrated in FIG. 3 is a functional configuration, and the hardware configuration may be different from this configuration. The functions of the terminal device 20 may be distributed and implemented in a plurality of physically separated configurations.

The communication unit 21 is a communication interface for communicating with other devices. For example, the communication unit 21 is a LAN interface such as an NIC. Note that the communication unit 21 may be a wired interface or a wireless interface. The communication unit 21 communicates with the server device 10 and the like under the control of the control unit 25.

The storage unit 22 is a storage device that can read and write data, such as a DRAM, SRAM, flash memory, and hard disk. The storage unit 22 stores various pieces of necessary information as appropriate under the control of the control unit 25.

The input unit 23 is an input device that receives various inputs from the outside. The input unit 23 includes an operating device that receives input operations. The operating device is, for example, a device with which the user executes various operations, such as a keyboard, mouse, and operation keys. Note that if the terminal device 20 adopts a touch panel, the touch panel is also included in the operating device. In this case, the user executes various operations by touching the screen with a finger or stylus. The operating device may be a voice input device (for example, microphone) that receives input operations by voice of the operator.

The output unit 24 is a device that executes various outputs such as sound, light, vibration, and images to the outside. The output unit 24 includes a display device that displays various pieces of information. The display device is, for example, a liquid crystal display or an organic electro luminescence (EL) display. Note that if the terminal device 20 adopts a touch panel, the display device may be an integrated device with the operating device of the input unit 23. The output unit 24 executes various outputs to the user under the control of the control unit 25.

The control unit 25 is a controller that controls each unit of the terminal device 20. The control unit 25 is implemented, for example, by a processor such as a CPU or MPU. For example, the control unit 25 is implemented by the processor executing various programs stored in the storage unit 22 by using the RAM and the like as a work area. Note that the control unit 25 may be implemented by an integrated circuit such as an ASIC or FPGA. The CPU, MPU, ASIC, and FPGA can all be regarded as controllers. The control unit 25 may be implemented by a GPU, in addition to or instead of the CPU.

1-4. Configuration Example of Presenter Terminal Device

Figure 4:
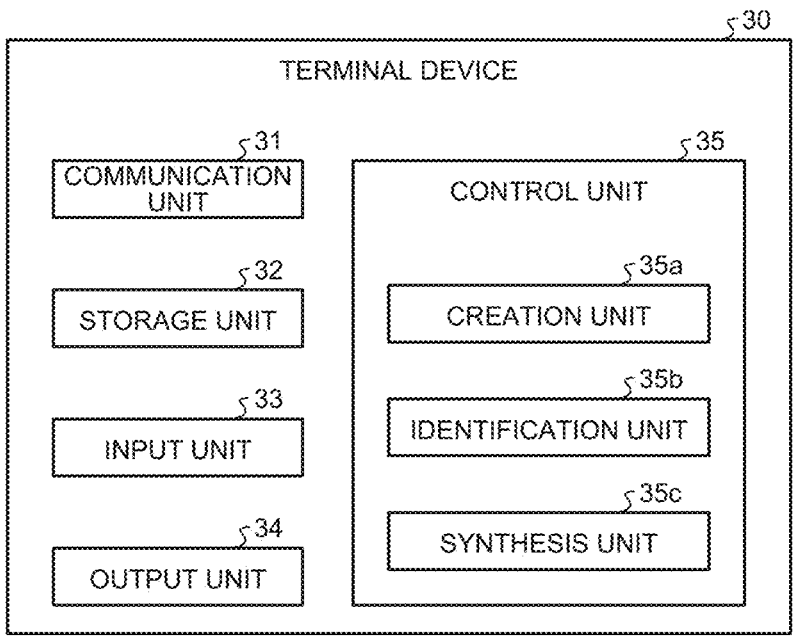
FIG. 4 is a diagram illustrating one example of a schematic configuration of a presenter terminal device according to the embodiment of the present disclosure.

A configuration example of the presenter terminal device 30 according to the present embodiment will be described with reference to FIG. 4. FIG. 4 is a diagram illustrating one example of the schematic configuration of the presenter terminal device 30 according to the present embodiment.

As illustrated in FIG. 4, the terminal device 30 includes a communication unit 31, a storage unit 32, an input unit 33, an output unit 34, and a control unit 35. Note that the configuration illustrated in FIG. 4 is a functional configuration, and the hardware configuration may be different from this configuration. The functions of the terminal device 30 may be distributed and implemented in a plurality of physically separated configurations.

The communication unit 31 is a communication interface for communicating with other devices. For example, the communication unit 31 is a LAN interface such as an NIC.

Note that the communication unit 31 may be a wired interface or a wireless interface. The communication unit 31 communicates with the server device 10 and the like under the control of the control unit 35.

The storage unit 32 is a storage device that can read and write data, such as a DRAM, SRAM, flash memory, and hard disk. The storage unit 32 stores various pieces of necessary information as appropriate under the control of the control unit 35.

The input unit 33 is an input device that receives various inputs from the outside. The input unit 33 includes an imaging device that acquires images and an operating device that receives input operations. The imaging device is, for example, a camera having an imaging element. The operating device is, for example, a device with which the user executes various operations, such as a keyboard, mouse, and operation keys. Note that if the terminal device 30 adopts a touch panel, the touch panel is also included in the operating device. In this case, the user executes various operations by touching the screen with a finger or stylus. The operating device may be a voice input device (for example, microphone) that receives input operations by voice of the operator.

The output unit 34 is a device that executes various outputs such as sound, light, vibration, and images to the outside. The output unit 34 includes a display device that displays various pieces of information. The display device is, for example, a liquid crystal display or an EL display. Note that if the terminal device 30 adopts a touch panel, the display device may be an integrated device with the operating device of the input unit 33. The output unit 34 executes various outputs to the user under the control of the control unit 35.

The control unit 35 is a controller that controls each unit of the terminal device 20. The control unit 35 is implemented, for example, by a processor such as a CPU or MPU. For example, the control unit 35 is implemented by the processor executing various programs stored in the storage unit 32 by using the RAM and the like as a work area. Note that the control unit 35 may be implemented by an integrated circuit such as an ASIC or FPGA. The CPU, MPU, ASIC, and FPGA can all be regarded as controllers. The control unit 35 may be implemented by a GPU, in addition to or instead of the CPU.

The control unit 35 includes a creation unit 35*a*, an identification unit 35*b*, and a synthesis unit 35*c*. Each block constituting the control unit 35 (creation unit 35*a*, identification unit 35*b*, and synthesis unit 35*c*) is a functional block that shows the function of the control unit 35. These functional blocks may be software blocks or hardware blocks. For example, each block may be one software module implemented by software (including microprogram), or may be one circuit block on a semiconductor chip (die). Of course, each block may be one processor or one integrated circuit. The control unit 35 may include functional units different from each of the above-mentioned blocks. The configuration method of each block is arbitrary. Other devices may execute part or all of the operations of each block. The operation (processing example) of each block that constitutes the control unit 35 will be described later.

1-5. First Processing Example of Presenter Terminal Device

Figure 6:
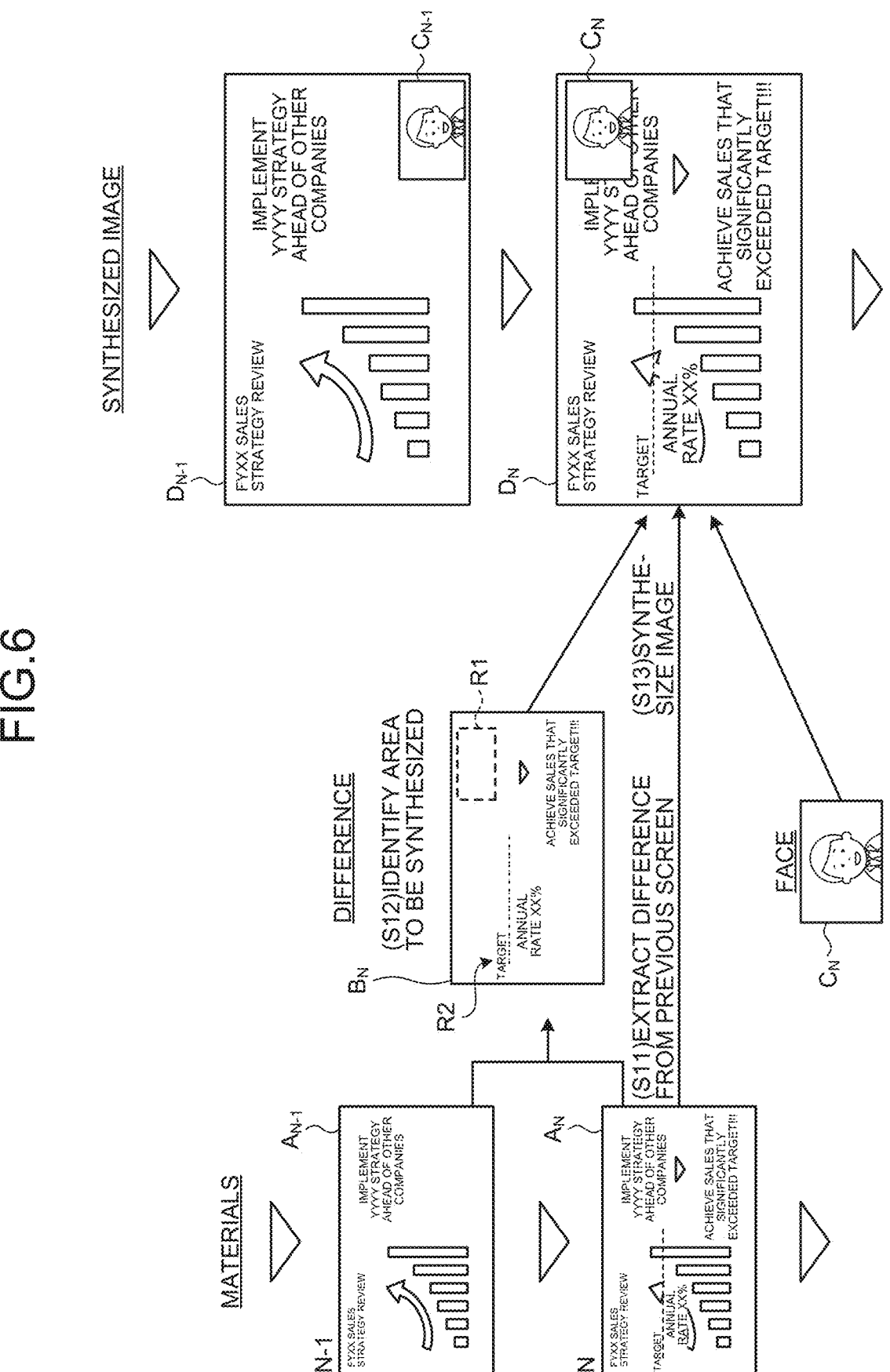
FIG. 6 is a diagram for describing the flow of the first processing example of the presenter terminal device according to the embodiment of the present disclosure.

The first processing example of the presenter terminal device 30 according to the present embodiment will be described with reference to FIGS. 5 and 6. FIG. 5 is a flowchart illustrating a flow of the first processing example of the presenter terminal device 30 according to the present embodiment. FIG. 6 is a diagram for describing the flow of the first processing example of the presenter terminal device 30 according to the present embodiment.

In the example of FIGS. 5 and 6, the information processing system 1 is a system that simultaneously presents the presentation materials (presentation item), the face of the presenter (presenter), and the like to the viewer in online meetings, online seminars, online classes, and the like.

As illustrated in FIGS. 5 and 6, in step S11, the creation unit 35*a* creates a difference image $B_N$ from a previous screen (previous image $A_{N-1}$) and a current screen (current image $A_N$). In step S12, the identification unit 35*b* identifies an area to be synthesized R1 in the difference image $B_N$ while avoiding a change area R2 where the information amount has changed. In step S13, the synthesis unit 35*c* synthesizes a face image $C_N$ in the area to be synthesized R1 on the current screen (current image $A_N$). Note that the previous image $A_{N-1}$ and the current image $A_N$ are, for example, consecutive images. The previous image $A_{N-1}$ corresponds to a first image, and the current image $A_N$ corresponds to a second image. The area to be synthesized R1 is, for example, an area with the size of the face image $C_N$ where the information amount is smallest in the difference image $B_N$.

Specifically, as illustrated in FIG. 6, the creation unit 35*a* compares the previous image $A_{N-1}$ (previous page) with the current image $A_N$ (current page) of the material to calculate the difference in the information amount, and creates the difference image $B_N$ regarding the difference in the information amount. Then, based on the difference image $B_N$ created by the creation unit 35*a*, the identification unit 35*b* identifies the area to be synthesized R1 with the size of the face image $C_N$ including the face of the presenter in the difference image $B_N$ while avoiding the change area R2. The synthesis unit 35*c* synthesizes the face image $C_N$ in the area to be synthesized R1 identified by the identification unit 35*b* in the current image $A_N$, and generates a synthesized image $D_N$ including the current image $A_N$ and the face image $C_N$. As a result, the face image $C_N$ is superimposed at a position that is as unobtrusive as possible for obtaining information from the materials in the current image $A_N$.

Here, for example, the materials (plurality of images) are stored in the storage unit 32 of the presenter terminal device 30, and are read from the storage unit 32 and used. The face image $C_N$ is acquired by an imaging device that is part of the input unit 33 of the presenter terminal device 30. Since the imaging device captures images of the upper body including the face of the presenter, the face image $C_N$ also includes parts other than the face. Therefore, the face image $C_N$ is an image including at least the face.

The synthesized image $D_N$ is displayed by the display device that is part of the output unit 34 of the presenter terminal device 30, is transmitted to each viewer terminal device 20 via the server device 10, and is displayed by the display device that is part of the output unit 24 of the viewer terminal device 20. Note that the server device 10 receives the synthesized image $D_N$ from the presenter terminal device 30, and transmits the received synthesized image $D_N$ to the viewer terminal device 20 participating in online meetings, online seminars, online classes, and the like via the network N.

By such processing, the identification unit 35*b* identifies the area to be synthesized R1 with the size of the face image $C_N$ while avoiding the change area R2 in the difference image $B_N$. The area to be synthesized R1 is, for example, an area with the size of the face image $C_N$ where the change in the information amount is smallest (for example, area with the size of the face image $C_N$ where there is no change in the information amount) in the previous image $A_{N-1}$ and the current image $A_N$. Since the face image $C_N$ is synthesized in the area to be synthesized R1 identified in the current image $A_N$, the face image $C_N$ is synthesized at an appropriate position in the current image $A_N$, that is, at a position that is as unobtrusive as possible for obtaining information from the materials. For example, in the example of FIG. 6, in the synthesized image $D_N$, the face image $C_N$ is superimposed on the information on the current image $A_N$. Information in the place is also displayed on the previous image $A_{N-1}$, and is understood by the viewer. Therefore, there is no problem even if the face image $C_N$ is superimposed on the place. In this way, since it is possible to superimpose the materials (presentation item) and the face (presenter) while minimizing the omission of the information amount, effective use of the screen area can be achieved. By following the change in the materials (presentation item), effective use of the screen area can be automatically achieved without requiring effort from the presenter or the viewer.

Here, the size of the face image $C_N$ is set in advance, but is not limited to this example and, for example, may be changed (enlarged or reduced) by the user. For example, the user who is a presenter may operate the input unit 33 to change the size of the face image $C_N$, or the user who is a viewer may operate the input unit 23 to change the size of the face image $C_N$. The size of the face image $C_N$ may be changed automatically. For example, the identification unit 35b identifies the area to be synthesized R1 according to the size of the face image $C_N$ changed by the user, or the size of the face image $C_N$ automatically changed.

Note that the identification unit 35b determines the change area R2 based on the difference image $B_N$ and identifies the area to be synthesized R1 while avoiding the determined change area R2, but is not limited to this example. For example, the identification unit 35b may determine the change in entropy (for example, clutter) or blank area (for example, white area) between the previous image $A_{N-1}$ and the current image $A_N$ without using the difference image $B_N$, determine the change area R2 based on obtained change information such as entropy and white area, and identify the area to be synthesized R1 while avoiding the determined change area R2.

The synthesis unit 35c may generate the synthesized image $D_N$ at timing of switching from the previous image $A_{N-1}$ to the current image $A_N$, or may generate the synthesized image $D_N$ at timing when part of the previous image $A_{N-1}$ (for example, animation) changes to the current image $A_N$. Such timing is set in advance, but is not limited to this example and, for example, may be changed by the user as described above. Note that the face image $C_N$ is updated at predetermined intervals (for example, at regular intervals). The predetermined intervals are set in advance, but are not limited to this example and, for example, may be changed by the user as described above.

1-6. Modification of Information Processing System

Figure 7:
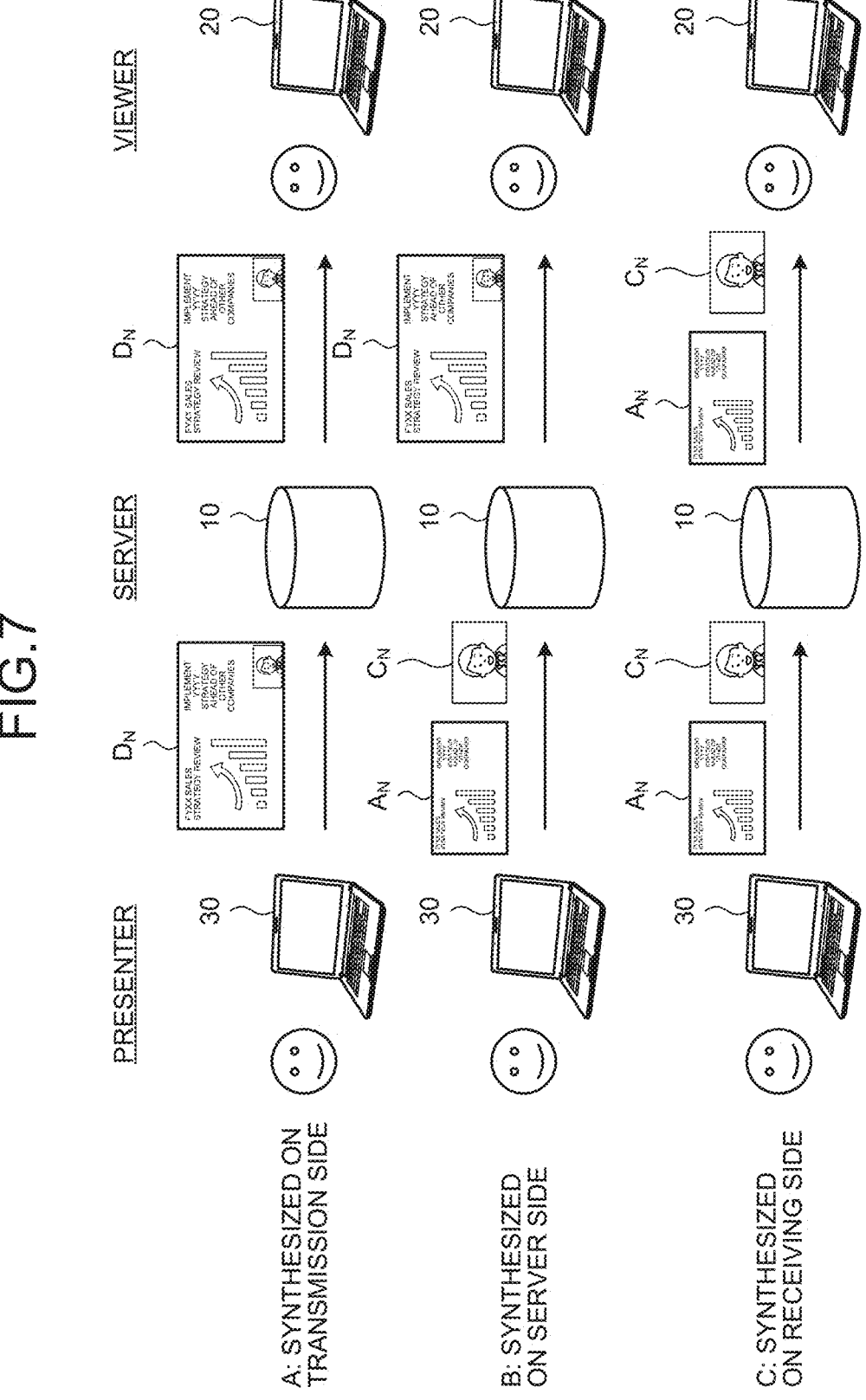
FIG. 7 is a diagram for describing a modification of the information processing system according to the embodiment of the present disclosure.

A modification of the information processing system 1 according to the present embodiment will be described with reference to FIG. 7. FIG. 7 is a diagram for describing the modification of the information processing system 1 according to the present embodiment.

As illustrated in FIG. 7, the information processing system 1 generates the synthesized image $D_N$ with the presenter terminal device 30, which is a presenter, as described above (A: synthesized on the transmission side), but is not limited to this example. For example, the information processing system 1 may generate the synthesized image $D_N$ with the server device 10 (B: synthesized on the server side), or may generate the synthesized image $D_N$ with the viewer terminal device 20 (C: synthesized on the receiving side).

In the case of A: synthesis is executed on the transmission side, the presenter terminal device 30 includes the creation unit 35a, the identification unit 35b, and the synthesis unit 35c, as described above. The presenter terminal device 30 generates the synthesized image $D_N$ by the above-described process, and transmits the generated synthesized image $D_N$ to the server device 10. The server device 10 receives the synthesized image $D_N$ transmitted from the terminal device 30, and transmits the received synthesized image $D_N$ to each viewer terminal device 20. Each viewer terminal device 20 receives the synthesized image $D_N$ transmitted from the server device 10, and displays the synthesized image with the display device, which is part of the output unit 24. Note that the presenter can also change the position of the face image $C_N$ by executing input operations in the input unit 33 of the terminal device 30 (for example, mouse or touch panel).

In the case of B: synthesis is executed on the server side, the presenter terminal device 30 transmits the current image $A_N$ of the materials and the face image $C_N$ to the server device 10 as it is. The server device 10 includes the creation unit 35a, the identification unit 35b, and the synthesis unit 35c. The server device 10 receives the current image $A_N$ of the materials and the face image $C_N$ transmitted from the terminal device 30, generates the synthesized image $D_N$ by the above-described process, and transmits the synthesized image to each viewer terminal device 20. Each viewer terminal device 20 receives the synthesized image $D_N$ transmitted from the server device 10, and displays the synthesized image with the display device, which is part of the output unit 24. By such processes, since the server device 10 executes a series of synthesis processes, the processing load on other terminal devices 20 and 30 can be reduced.

In the case of C: synthesis is executed on the receiving side, the presenter terminal device 30 transmits the current image $A_N$ of the materials and the face image $C_N$ to the server device 10 as they are. The server device 10 receives the current image $A_N$ of the materials and the face image $C_N$ transmitted from the presenter terminal device 30, and transmits the received current image $A_N$ of the materials and the face image $C_N$ to each viewer terminal device 20 as they are. These viewer terminal devices 20 each include the creation unit 35a, the identification unit 35b, and the synthesis unit 35c. Each viewer terminal device 20 receives the current image $A_N$ of the materials and the face image $C_N$ transmitted from the server device 10, generates the synthesized image $D_N$ by the above-described process, and displays the synthesized image with the display device, which is part of the output unit 24. Note that the viewer can also change the position of the face image $C_N$ by executing input operations in the input unit 23 of the terminal device 20 (for example, mouse or touch panel).

Note that the presenter terminal device 30 and the viewer terminal device 20 execute communication via the server device 10, but are not limited to this example and may, for example, execute direct communication (P2P) without going through the server device 10. In this case, A: synthesis may be executed on the transmission side, or C: synthesis may be executed on the receiving side.

1-7. Second Processing Example of Presenter Terminal Device

Figure 8:
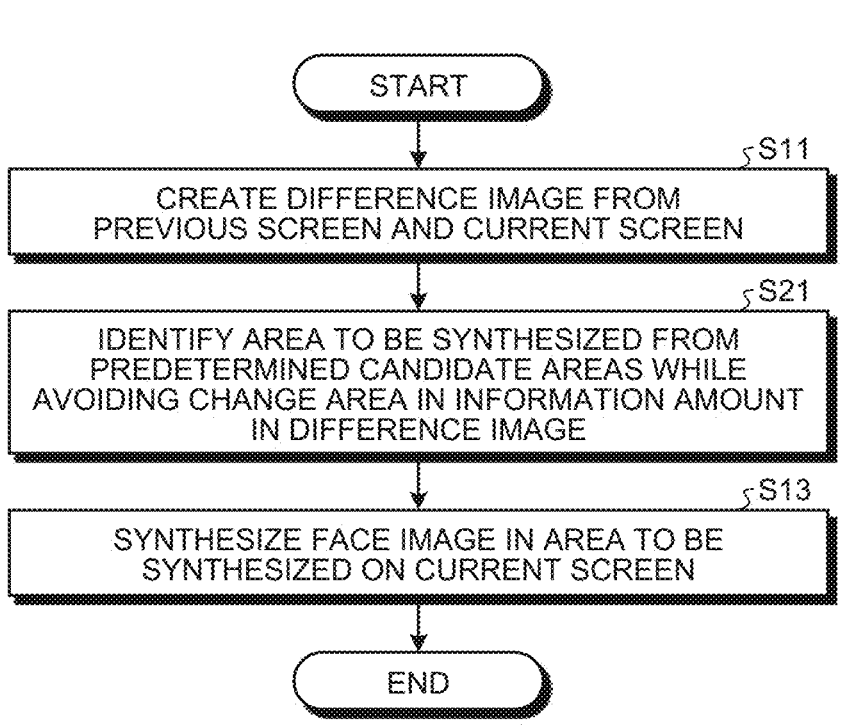
FIG. 8 is a flowchart illustrating a flow of a second processing example of the presenter terminal device according to the embodiment of the present disclosure.
Figure 9:
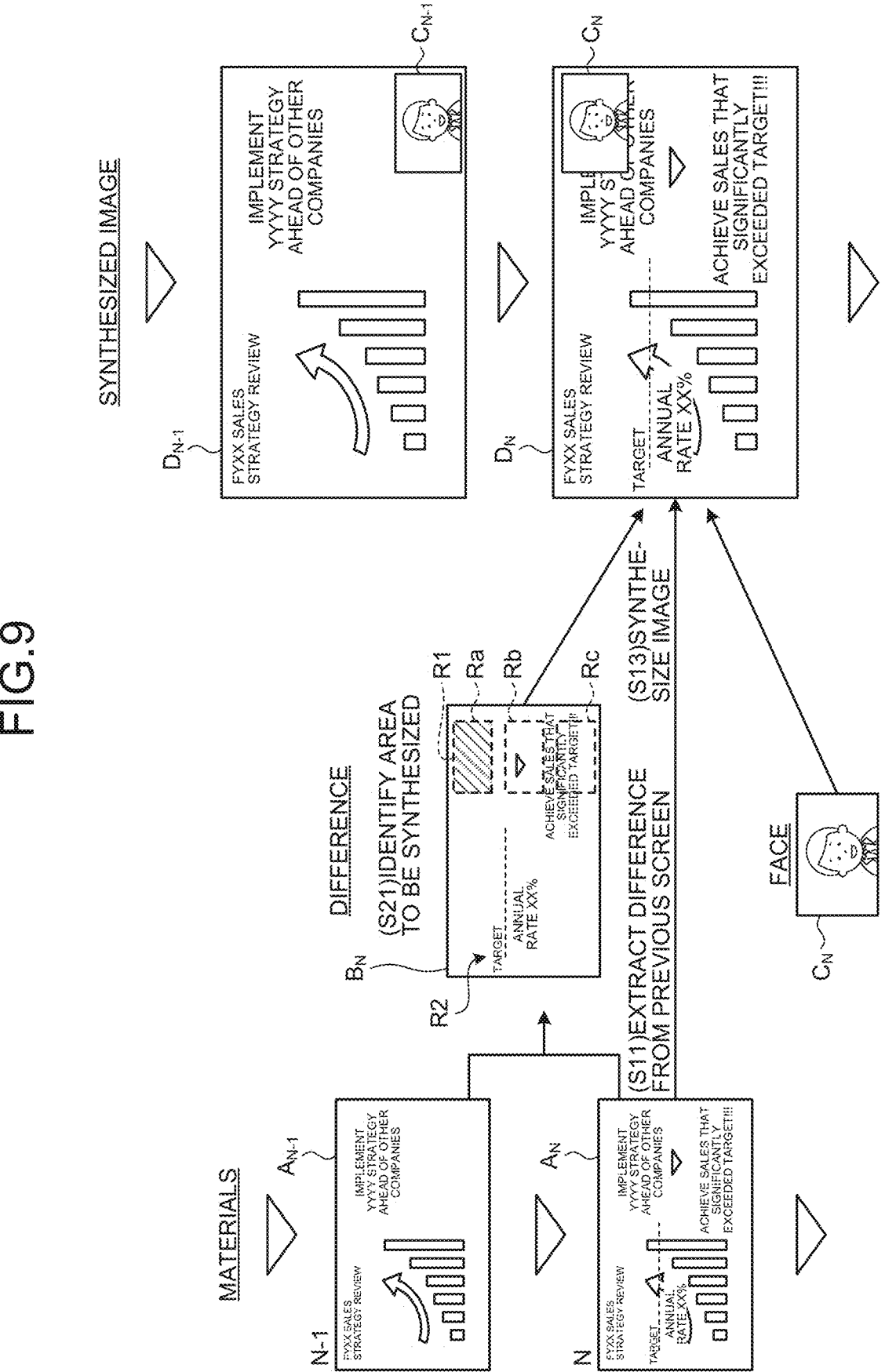
FIG. 9 is a diagram for describing the flow of the second processing example of the presenter terminal device according to the embodiment of the present disclosure.

The second processing example of the presenter terminal device 30 according to the present embodiment will be described with reference to FIGS. 8 and 9. FIG. 8 is a flowchart illustrating the flow of the second processing example of the presenter terminal device 30 according to the present embodiment. FIG. 9 is a diagram for describing the flow of the second processing example of the presenter terminal device 30 according to the present embodiment.

In the example of FIGS. 8 and 9, in a similar manner to the example of FIGS. 5 and 6, the information processing system 1 is a system that simultaneously presents the presentation materials (presentation item), the face of the presenter (presenter), and the like to the viewer in online meetings, online seminars, online classes, and the like.

As illustrated in FIGS. 8 and 9, in step S11, the creation unit 35$a$ creates the difference image $B_N$ from the previous screen (previous image $A_{N-1}$) and the current screen (current image $A_N$). In step S21, the identification unit 35$b$ identifies the area to be synthesized R1 from the predetermined candidate areas Ra, Rb, and Rc in the difference image $B_N$ while avoiding the change area R2 where the information amount has changed. In step S13, the synthesis unit 35$c$ synthesizes the face image $C_N$ in the area to be synthesized R1 on the current screen (current image $A_N$).

Each of the candidate areas Ra, Rb, and Rc is an area that is a candidate for the position where the face image $C_N$ is superimposed (area to be synthesized R1), and is determined in advance. The individual size of the candidate areas Ra, Rb, and Rc is, for example, the same as the size of the face image $C_N$. In the example of FIG. 9, the three predetermined candidate areas Ra, Rb, and Rc are determined in advance on the right side of the screen. The identification unit 35$b$ selects the area to be synthesized R1 from among the candidate areas Ra, Rb, and Rc. As a result, the face image $C_N$ is superimposed on the current best position among the candidate areas Ra, Rb, and Rc.

Note that the priority (priority order) may be assigned in advance to each of the candidate areas Ra, Rb, and Rc. In the example of FIG. 9, among the three candidate areas Ra, Rb, and Rc, the priority of the upper candidate area Ra is the first, the priority of the lower candidate area Rc is the second, and the priority of the candidate area Rb in the middle is the third. In the example of FIG. 9, among the candidate areas Ra, Rb, and Rc, since the candidate area Rc overlaps with the change area R2, the area to be synthesized R1 is selected from two candidate areas Ra and Rb based on the priority. As a result, the candidate area Ra is identified as the area to be synthesized R1. In this way, by setting the candidate area to be selected preferentially, since the candidate area is determined as the area to be synthesized R1 with priority and the face image $C_N$ is displayed preferentially in the area to be synthesized R1, the viewer will be able to more easily predict the position of the presenter's face.

Here, the candidate areas Ra, Rb, and Rc and the predetermined priority are set in advance, but are not limited to this example and, for example, may be changed by the user. For example, the user who is a presenter may operate the input unit 33 to change the candidate areas Ra, Rb, and Rc or the predetermined priority, or the user who is a viewer may operate the input unit 23 to change the candidate areas Ra, Rb, and Rc or the predetermined priority.

The individual size of each of the candidate areas Ra, Rb, and Rc is the same as the size of the face image $C_N$, but is not limited to this example. For example, the size of each of the candidate areas Ra, Rb, and Rc may be larger than the size of the face image $C_N$, and may also be different from each other. The area to the right or the area below the center of the screen may be set to the predetermined candidate area. Note that the number of candidate areas Ra, Rb, and Rc is not limited.

1-8. Third Processing Example of Presenter Terminal Device

Figure 10:
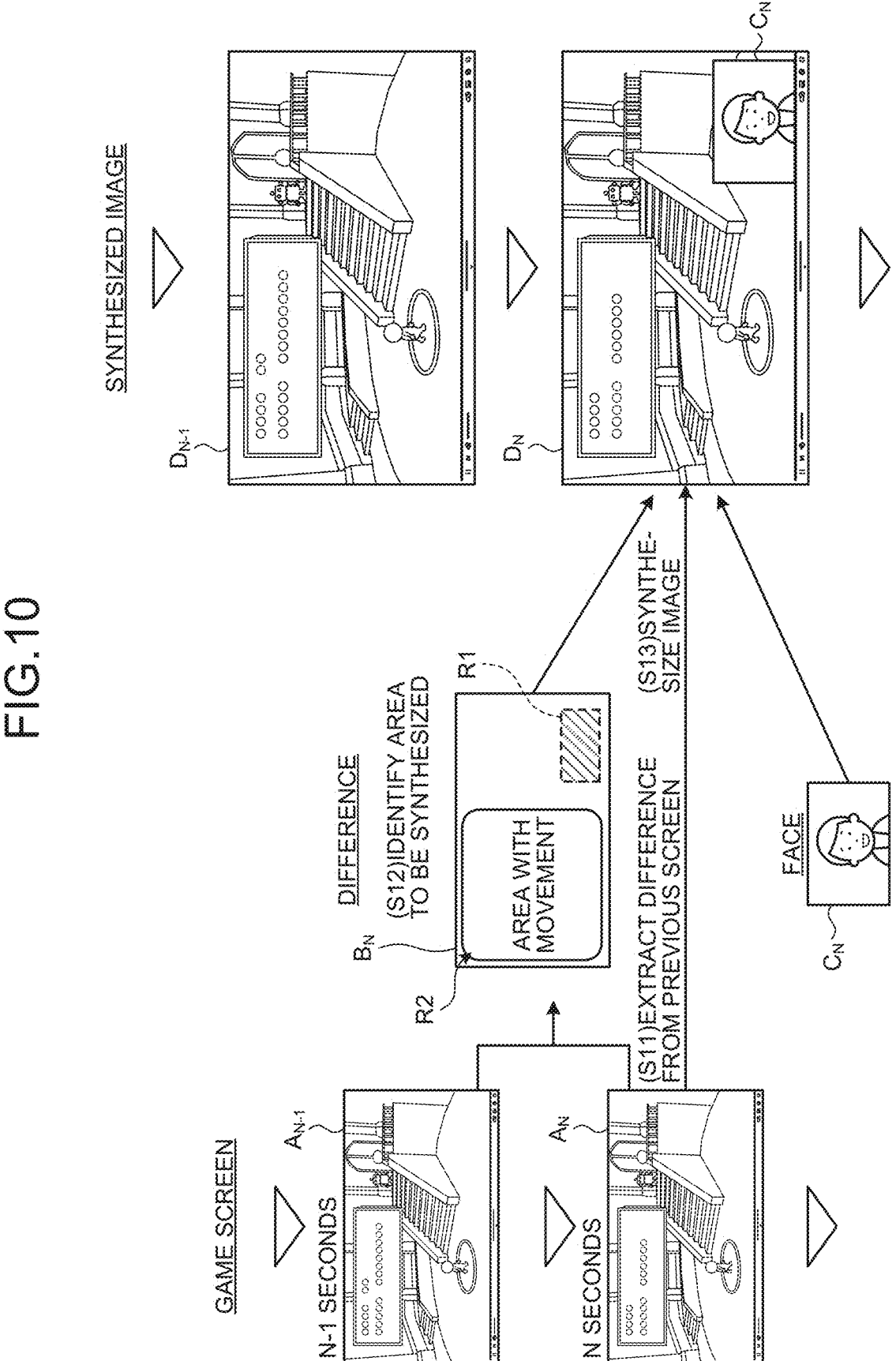
FIG. 10 is a diagram for describing a flow of a third processing example of the presenter terminal device according to the embodiment of the present disclosure.

The third processing example of the presenter terminal device 30 according to the present embodiment will be described with reference to FIG. 10. FIG. 10 is a diagram for describing the flow of the third processing example of the presenter terminal device 30 according to the present embodiment.

In the example of FIG. 10, in a similar manner to the example of FIGS. 5 and 6, the information processing system 1 is a system that simultaneously presents an image of the subject being commented (presentation item), the face of a live commentator (presenter), and the like to the viewer in online live commentary of games, sports, and the like. The flow of processing related to the example of FIG. 10 is similar to the example of FIGS. 5 and 6.

As illustrated in FIG. 10, the creation unit 35$a$, the identification unit 35$b$, and the synthesis unit 35$c$ basically execute the same processing as steps S11 to S13 in FIG. 5. Specifically, for example, the creation unit 35$a$ captures the screen at predetermined intervals (for example, at regular intervals), compares the previous screen of a game screen (previous image $A_{N-1}$) with the current screen (current image $A_N$) to calculate the difference in the information amount, and creates the difference image $B_N$ regarding the difference in the information amount. Then, in the difference image $B_N$ created by the creation unit 35$a$, the identification unit 35$b$ identifies the area to be synthesized R1 with the size of the face image $C_N$ (for example, area with the size of the face image $C_N$ without movement) while avoiding the change area R2 where the information amount has changed (for example, area with movement). The synthesis unit 35$c$ synthesizes the face image $C_N$ in the area to be synthesized R1 identified, and generates the synthesized image $D_N$ including the current image $A_N$ and the face image $C_N$.

By such processing, the identification unit 35$b$ identifies the area to be synthesized R1 with the size of the face image $C_N$ while avoiding the change area R2 in the difference image $B_N$. The area to be synthesized R1 is, for example, an area with the size of the face image $C_N$ where the change in the information amount is smallest (for example, area with the size of the face image $C_N$ where there is no change in the information amount, that is, area with the size of the face image $C_N$ without movement) in the previous image $A_{N-1}$ and the current image $A_N$. Since the face image $C_N$ is synthesized in the area to be synthesized R1 identified in the current image $A_N$, the face image $C_N$ is synthesized at an appropriate position in the current image $A_N$, that is, at a position that is as unobtrusive as possible for obtaining information from the screen. For example, while displaying a game image (game video) to fill the screen, the face image $C_N$ can be superimposed at a position and timing that is unobtrusive for the expression of movement. Note that since the synthesis unit 35$c$ does not synthesize the face image $C_N$ in an area with movement, the face image $C_N$ may not be displayed while there is movement in consecutive images.

Here, the predetermined interval (for example, regular interval) regarding the above screen capture is set in advance, but is not limited to this example and, for example, may be changed by the user. For example, the user who is a presenter may operate the input unit 33 to change the predetermined interval, or the user who is a viewer may operate the input unit 23 to change the predetermined interval. The predetermined interval may be changed automatically.

Note that it is also possible to apply the third processing example to the first processing example or the second processing example. For example, in the first processing example or the second processing example, the identification unit 35*b* may identify the area to be synthesized R1 with the size of the face image $C_N$, based on the movement of displayed objects such as a mouse pointer that is displayed in response to a mouse, which is part of the input unit 33. For example, the area with movement is an area where there is a change in the information amount, and the area without movement is an area where there is no change in the information amount.

The synthesis unit 35*c* may change the size of the face image $C_N$ depending on whether there is an area with movement within the current image $A_N$. For example, when there is no area with movement within the current image $A_N$, the synthesis unit 35*c* may enlarge the face image $C_N$ from the original size. After enlargement of the face image $C_N$, when there is an area with movement within the current image $A_N$, the face image $C_N$ may be reduced to the original size.

The synthesis unit 35*c* may switch between executing and not executing the synthesis of the face image $C_N$ with respect to the area to be synthesized R1 in the current image $A_N$ depending on whether there is an area with movement within the current image $A_N$. For example, when there is no area with movement in the current image $A_N$, the synthesis unit 35*c* executes the synthesis of the face image $C_N$ with respect to the area to be synthesized R1 in the current image $A_N$, and when there is an area with movement in the current image $A_N$, the synthesis unit 35*c* does not execute the synthesis of the face image $C_N$ with respect to the area to be synthesized R1 in the current image $A_N$.

The synthesis unit 35*c* may change the size of the face image $C_N$ depending on the scene regarding the current image $A_N$. For example, when the scene involves live commentary of games, sports, and the like, that is, when the presenter is providing live commentary, the face image $C_N$ may be enlarged more than when the live commentary is not provided. After the enlargement of the face image $C_N$, when the scene of live commentary ends, the face image $C_N$ may be reduced to the original size. When the scene is in a questions and answers session, the face image $C_N$ may be enlarged more than when the scene is not in the questions and answers session. After the enlargement of the face image $C_N$, when the scene of questions and answers ends, the face image $C_N$ may be reduced to the original size.

1-9. Actions and Advantageous Effects

As described above, according to the present embodiment, a presenter terminal device 30 (one example of information processing device) includes: an identification unit 35*b* that identifies an area to be synthesized R1 having a size of a face image $C_N$ including a face while avoiding a change area R2 where an information amount in a first image (for example, previous image $A_{N-1}$) and a second image (for example, current image $A_N$) changes; and a synthesis unit 35*c* that synthesizes the face image $C_N$ in the area to be synthesized R1 in the second image and generates a synthesized image $D_N$ including the second image and the face image $C_N$. With this configuration, in the presentation item that is the second image, the face image $C_N$ including the face of the presenter is superimposed at a position that is as unobtrusive as possible for obtaining information from the presentation item. Therefore, the presentation item and the presenter can be appropriately displayed while effectively using the screen area.

The presenter terminal device 30 may further include the creation unit 35*a* that creates the difference image $B_N$ from the first image and the second image, and the identification unit 35*b* may determine the change area R2 based on the difference image $B_N$ and identifies the area to be synthesized R1 while avoiding the determined change area R2. This makes it possible to reliably identify the area to be synthesized R1 of the second image.

The identification unit 35*b* may determine the change area R2 based on a change in entropy or a blank area between the first image and the second image, and identify the area to be synthesized R1 while avoiding the determined change area R2. This makes it possible to reliably identify the area to be synthesized R1 of the second image.

The identification unit 35*b* may identify the area to be synthesized R1 from a plurality of predetermined candidate areas (for example, candidate areas Ra, Rb, and Rc) within the difference image $B_N$. As a result, by setting each candidate area, the face image $C_N$ is displayed only in one of the candidate areas, allowing the viewer to more easily predict the position of the face.

The predetermined candidate area may be set in advance by the user. This allows the presenter, the viewer, or the like who is the user to display the face image $C_N$ at a desired position on the screen.

The identification unit 35*b* may identify the area to be synthesized R1 from the plurality of predetermined candidate areas based on predetermined priority. As a result, by setting the candidate area with high priority, the face image $C_N$ is displayed preferentially in the candidate area with high priority, allowing the viewer to more easily predict the position of the face.

The predetermined priority may be set in advance by the user. This allows the presenter, the viewer, or the like who is the user to display the face image $C_N$ in a desired area among the candidate areas.

The identification unit 35*b* may identify the area to be synthesized R1 having the size of the enlarged face image $C_N$ in response to the enlargement of the face image $C_N$. As a result, the size of the face image $C_N$ becomes larger, making the face image $C_N$ easier to see.

The identification unit 35*b* may identify the area to be synthesized R1 having the size of the reduced face image $C_N$ in response to the reduction of the face image $C_N$. As a result, the size of the face image $C_N$ becomes smaller, allowing the face image $C_N$ to be reliably synthesized at an appropriate position in the second image.

The synthesis unit 35*c* may generate the synthesized image $D_N$ at timing of switching from the first image to the second image. This allows the synthesized image $D_N$ to be obtained at appropriate timing.

The synthesis unit 35*c* may generate the synthesized image $D_N$ at timing when part of the first image changes to the second image. This allows the synthesized image $D_N$ to be obtained at appropriate timing.

The synthesis unit 35c may change the size of the face image $C_N$ depending on whether there is an area with movement within the second image. This allows the face image $C_N$ to be enlarged or the face image $C_N$ to be reduced depending on whether there is movement from the first image to the second image.

The synthesis unit 35c may enlarge the face image $C_N$ when the area with movement does not exist within the second image, and reduce the face image $C_N$ when the area with movement exists within the second image. As a result, when there is no movement from the first image to the second image, the face image $C_N$ is enlarged, allowing the viewer to draw attention to the presenter. Meanwhile, when there is movement from the first image to the second image, the face image $C_N$ is reduced, allowing the viewer to draw attention to the presentation item, which is the second image.

The synthesis unit 35c may switch between executing and not executing synthesis of the face image $C_N$ with respect to the area to be synthesized R1 depending on whether there is an area with movement within the second image. This makes it possible to execute the synthesis of the face image $C_N$ or not to execute the synthesis of the face image $C_N$, depending on whether there is movement from the first image to the second image.

The synthesis unit 35c may execute synthesis of the face image $C_N$ with respect to the area to be synthesized R1 when the area with movement does not exist within the second image, and stops the synthesis of the face image $C_N$ with respect to the area to be synthesized R1 when the area with movement exists within the second image. As a result, when there is no movement from the first image to the second image, the face image $C_N$ is synthesized in the second image, allowing the viewer to draw attention to the presenter. Meanwhile, when there is movement from the first image to the second image, the face image $C_N$ is not synthesized in the second image, allowing the viewer to draw attention to the presentation item that is the second image.

The synthesis unit 35c may change the size of the face image $C_N$ depending on the scene regarding the second image. This allows the viewer to draw attention to the presentation item or the presenter depending on the scene.

The synthesis unit 35c may reduce the face image $C_N$ when the scene involves live commentary. This allows the viewer to draw attention to the presentation item that is the second image.

The synthesis unit 35c may enlarge the face image $C_N$ when the scene is in a questions and answers session. This allows the viewer to draw attention to the presenter.

2. Other Embodiments

The processing according to the embodiment (or modification) described above may be executed in various different forms (modifications) other than the above-mentioned embodiment. For example, among the processes described in the above embodiment, all or part of the processes described as being automatically executed may be executed manually, or all or part of the processes described as being executed manually can also be executed automatically using known methods. In addition, information including processing procedures, specific names, various data and parameters shown in the above documents and drawings can be changed arbitrarily unless otherwise specified. For example, various pieces of information illustrated in each figure are not limited to the information illustrated.

Each component of each device illustrated is functionally conceptual, and does not necessarily have to be physically configured as illustrated in the drawings That is, the specific form of distribution and integration of each device is not limited to that illustrated. All or part thereof can be functionally or physically distributed and integrated into arbitrary units depending on various loads, usage situations, and the like.

The above-described embodiments (or modifications) can be combined as appropriate as long as the processing contents are not inconsistent. The effects described in this specification are merely illustrative and not restrictive, and other effects may also be produced.

3. Configuration Example of Hardware

Figure 11:
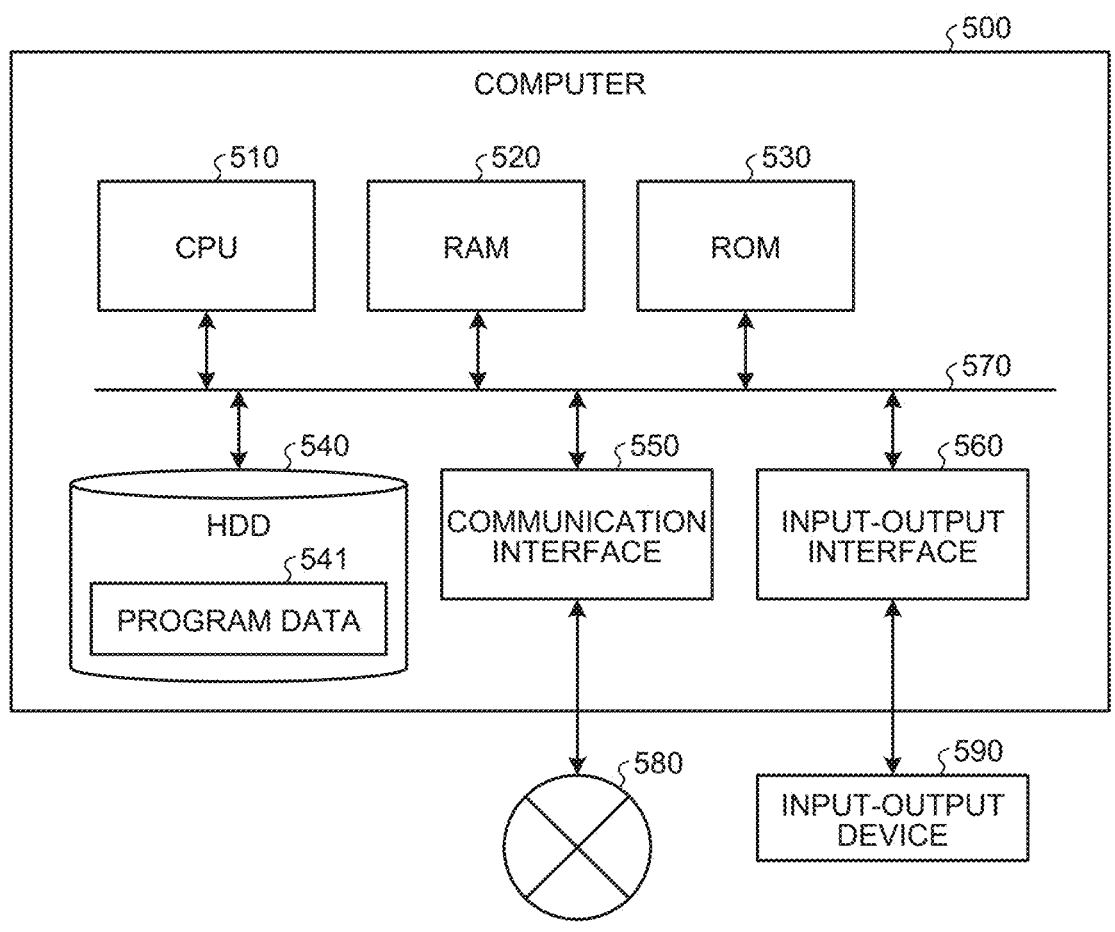
FIG. 11 is a diagram illustrating one example of a schematic configuration of hardware according to the embodiment of the present disclosure.

The specific hardware configuration example of information devices such as the server device 10 and each of the terminal devices 20 and 30 according to the embodiments (or modifications) described above will be described. The information devices such as the server device 10 and each of the terminal devices 20 and 30 according to the embodiments (or modifications) may be implemented, for example, by a computer 500 having the configuration illustrated in FIG. 11. FIG. 11 is a diagram illustrating the configuration example of hardware that implements functions of the information devices such as the server device 10 and each of the terminal devices 20 and 30 according to the embodiments (or modifications).

As illustrated in FIG. 11, the computer 500 includes a CPU 510, a RAM 520, a read only memory (ROM) 530, a hard disk drive (HDD) 540, a communication interface 550, and an input-output interface 560. Each unit of the computer 500 is connected by a bus 570.

The CPU 510 operates based on a program stored in the ROM 530 or HDD 540 to control each unit. For example, the CPU 510 expands the program stored in the ROM 530 or HDD 540 into the RAM 520, and executes processes corresponding to various programs.

The ROM 530 stores boot programs such as the basic input output system (BIOS) executed by the CPU 510 when starting up the computer 500 and programs that depend on hardware of the computer 500.

The HDD 540 is a computer-readable recording medium that non-transitorily records programs executed by the CPU 510 and data used by the programs. Specifically, the HDD 540 is a recording medium that records an information processing program according to the present disclosure, which is one example of program data 541.

The communication interface 550 is an interface for the computer 500 to connect to an external network 580 (Internet as one example). For example, the CPU 510 receives data from other devices or transmits data generated by the CPU 510 to other devices via the communication interface 550.

The input-output interface 560 is an interface for connecting an input-output device 590 to the computer 500. For example, the CPU 510 receives data from input devices such as a keyboard and mouse via the input-output interface 560. The CPU 510 transmits data to output devices such as a display, speaker, or printer via the input-output interface 560.

Note that the input-output interface 560 may function as a media interface that reads a program recorded on a predetermined recording medium (media) or the like. As the media, for example, optical recording medium such as a digital versatile disc (DVD) and phase change rewritable disk (PD), magneto-optical recording medium such as a magneto-optical disk (MO), a tape medium, a magnetic recording medium, a semiconductor memory, or the like is used.

Here, for example, when the computer 500 functions as an information device such as the server device 10 or each of the terminal devices 20 and 30 according to the embodiments (or modifications), the CPU 510 of the computer 500 implements all or part of functions of each unit such as the server device 10 and each of the terminal devices 20 and 30 according to the embodiments (or modifications) by executing the information processing program loaded on the RAM 520. The HDD 540 stores information processing programs and data according to the present disclosure (for example, various pieces of information including image information such as the image of the presentation item and the face image of the presenter). Note that the CPU 510 reads and executes the program data 541 from the HDD 540, but may acquire these programs from other devices via the external network 580 as another example.

4. Additional Notes

Note that this technology can also have the following configurations.

(1)

An information processing device comprising:

an identification unit that identifies an area to be synthesized in a second image while avoiding a change area where an information amount in a first image and the second image changes, the area to be synthesized having a size of a face image including a face; and a synthesis unit that synthesizes the face image in the area to be synthesized in the second image and generates a synthesized image including the second image and the face image.

(2)

The information processing device according to (1), further comprising a creation unit that creates a difference image from the first image and the second image, wherein the identification unit determines the change area based on the difference image and identifies the area to be synthesized while avoiding the determined change area.

(3)

The information processing device according to (1), wherein the identification unit determines the change area based on a change in entropy or a blank area between the first image and the second image, and identifies the area to be synthesized while avoiding the determined change area.

(4)

The information processing device according to (2), wherein the identification unit identifies the area to be synthesized from a plurality of predetermined candidate areas within the difference image.

(5)

The information processing device according to (4), wherein the predetermined candidate areas are set in advance by a user.

(6)

The information processing device according to (4), wherein the identification unit identifies the area to be synthesized from the plurality of predetermined candidate areas based on predetermined priority.

(7)

The information processing device according to (6), wherein the predetermined priority is set in advance by a user.

(8)

The information processing device according to any one of (1) to (7), wherein the identification unit identifies the area to be synthesized having the size of the enlarged face image in response to enlargement of the face image.

(9)

The information processing device according to any one of (1) to (7), wherein the identification unit identifies the area to be synthesized having the size of the reduced face image in response to reduction of the face image.

(10)

The information processing device according to any one of (1) to (9), wherein the synthesis unit generates the synthesized image at timing of switching from the first image to the second image.

(11)

The information processing device according to any one of (1) to (9), wherein the synthesis unit generates the synthesized image at timing when part of the first image changes to the second image.

(12)

The information processing device according to any one of (1) to (11), wherein the synthesis unit changes the size of the face image depending on whether there is an area with movement within the second image.

(13)

The information processing device according to (12), wherein the synthesis unit enlarges the face image when the area with movement does not exist within the second image, and reduces the face image when the area with movement exists within the second image.

(14)

The information processing device according to any one of (1) to (11), wherein the synthesis unit switches between executing and not executing synthesis of the face image with respect to the area to be synthesized depending on whether there is an area with movement within the second image.

(15)

The information processing device according to (14), wherein the synthesis unit executes synthesis of the face image with respect to the area to be synthesized when the area with movement does not exist within the second image, and stops the synthesis of face image with respect to the area to be synthesized when the area with movement exists within the second image.

(16)

The information processing device according to any one of (1) to (15), wherein the synthesis unit changes the size of the face image depending on a scene regarding the second image.

19

20

(17)

The information processing device according to (16), wherein the synthesis unit reduces the face image when the scene involves live commentary.

(18)

The information processing device according to (16), wherein the synthesis unit enlarges the face image when the scene is in a questions and answers session.

(19)

An information processing system comprising a plurality of information processing devices, any one of the plurality of information processing devices including:

an identification unit that identifies an area to be synthesized in a second image while avoiding a change area where an information amount in a first image and the second image changes, the area to be synthesized having a size of a face image including a face; and a synthesis unit that synthesizes the face image in the area to be synthesized in the second image and generates a synthesized image including the second image and the face image.

(20)

An information processing method comprising:

identifying an area to be synthesized in a second image while avoiding a change area where an information amount in a first image and the second image changes, the area to be synthesized having a size of a face image including a face; and synthesizing the face image in the area to be synthesized in the second image and generating a synthesized image including the second image and the face image.

(21)

An information processing system including the information processing device according to any one of (1) to (18).

(22)

An information processing method using the information processing device according to any one of (1) to (18).

REFERENCE SIGNS LIST

1 INFORMATION PROCESSING SYSTEM
10 SERVER DEVICE
11 COMMUNICATION UNIT
12 STORAGE UNIT
13 CONTROL UNIT
20 TERMINAL DEVICE
21 COMMUNICATION UNIT
22 STORAGE UNIT
23 INPUT UNIT
24 OUTPUT UNIT
25 CONTROL UNIT
30 TERMINAL DEVICE
31 COMMUNICATION UNIT
32 STORAGE UNIT
33 INPUT UNIT
34 OUTPUT UNIT
35 CONTROL UNIT
35a CREATION UNIT
35b IDENTIFICATION UNIT
35c SYNTHESIS UNIT
500 COMPUTER
541 PROGRAM DATA
550 COMMUNICATION INTERFACE
560 INPUT-OUTPUT INTERFACE

570 BUS
580 EXTERNAL NETWORK
590 INPUT-OUTPUT DEVICE
$A_N$ CURRENT IMAGE
$A_{N-1}$ PREVIOUS IMAGE
$B_N$ DIFFERENCE IMAGE
$C_N$ FACE IMAGE
$D_N$ SYNTHESIZED IMAGE
N NETWORK
R1 AREA TO BE SYNTHESIZED
R2 CHANGE AREA
Ra CANDIDATE AREA
Rb CANDIDATE AREA
Rc CANDIDATE AREA

The invention claimed is:

1. An information processing device comprising:

processing circuitry configured to identify an area to be synthesized in a second image while avoiding a change area where an information amount in a first image has changed between the first and the second image, wherein the second image is a subsequent frame to the first image, the area to be synthesized having a size of a face image including a face;

synthesize the face image in the area to be synthesized in the second image and generates a synthesized image including the second image and the face image; and switch between executing and not executing synthesis of the face image with respect to the area to be synthesized depending on whether there is an area with movement within the second image.

2. The information processing device according to claim 1, wherein the processing circuitry is further configured to create a difference image from the first image and the second image, and determine the change area based on the difference image and identifies the area to be synthesized while avoiding the determined change area.

3. The information processing device according to claim 2, wherein the processing circuitry is further configured to identify the area to be synthesized from a plurality of predetermined candidate areas within the difference image.

4. The information processing device according to claim 3, wherein the predetermined candidate areas are set in advance by a user.

5. The information processing device according to claim 3, wherein the processing circuitry is further configured to identify the area to be synthesized from the plurality of predetermined candidate areas based on predetermined priority.

6. The information processing device according to claim 5, wherein the predetermined priority is set in advance by a user.

7. The information processing device according to claim 1, wherein the processing circuitry is further configured to determine the change area based on a change in entropy or a blank area between the first image and the second image, and identify the area to be synthesized while avoiding the determined change area.

8. The information processing device according to claim 1, wherein the processing circuitry is further configured to identify the area to be synthesized having the size of the enlarged face image in response to enlargement of the face image.

9. The information processing device according to claim 1, wherein the processing circuitry is further configured to identify the area to be synthesized having the size of a reduced face image in response to reduction of the face image.

10. The information processing device according to claim 1, wherein the processing circuitry is further configured to generate the synthesized image at timing of switching from the first image to the second image.

11. The information processing device according to claim 1, wherein the processing circuitry is further configured to generate the synthesized image at timing when part of the first image changes to the second image.

12. The information processing device according to claim 1, wherein the processing circuitry is further configured to change the size of the face image depending on whether there is an area with movement within the second image.

13. The information processing device according to claim 12, wherein the processing circuitry is further configured to enlarge the face image when the area with movement does not exist within the second image, and reduce the face image when the area with movement exists within the second image.

14. The information processing device according to claim 1, wherein the processing circuitry is further configured to execute synthesis of the face image with respect to the area to be synthesized when the area with movement does not exist within the second image, and stop the synthesis of the face image with respect to the area to be synthesized when the area with movement exists within the second image.

15. The information processing device according to claim 1, wherein the processing circuitry is further configured to change the size of the face image depending on a scene regarding the second image.

16. The information processing device according to claim 15, wherein the processing circuitry is further configured to reduce the face image when the scene involves live commentary.

17. The information processing device according to claim 15, wherein the processing circuitry is further configured to enlarge the face image when the scene is in a questions and answers session.

18. An information processing system comprising a plurality of information processing devices, any one of the plurality of information processing devices including:

processing circuitry configured to identify an area to be synthesized in a second image while avoiding a change area where an information amount in a first image has changed between the first and the second image, wherein the second image is a subsequent frame to the first image, the area to be synthesized having a size of a face image including a face;

synthesize the face image in the area to be synthesized in the second image and generates a synthesized image including the second image and the face image; and switch between executing and not executing synthesis of the face image with respect to the area to be synthesized depending on whether there is an area with movement within the second image.

19. An information processing method comprising:

identifying an area to be synthesized in a second image while avoiding a change area where an information amount in a first image has changed between the first and the second image, wherein the second image is a subsequent frame to the first image, the area to be synthesized having a size of a face image including a face;

synthesizing the face image in the area to be synthesized in the second image and generating a synthesized image including the second image and the face image; and switching between executing and not executing synthesis of the face image with respect to the area to be synthesized depending on whether there is an area with movement within the second image.

* * * * *